United States Patent

Bakke et al.

[11] Patent Number: 6,163,679
[45] Date of Patent: Dec. 19, 2000

[54] METHOD AND APPARATUS FOR SYSTEM ACQUISITION FOR A SUBSCRIBER UNIT

[75] Inventors: Bradley B Bakke, Lake in the Hills; Daniel T. Buhmann, Hainesville; R. Travis Jones, Lake Zurich, all of Ill.

[73] Assignee: Motorola, Inc., Schaumburg, Ill.

[21] Appl. No.: 09/149,417

[22] Filed: Sep. 8, 1998

[51] Int. Cl.$^7$ .................................................. H04B 7/185
[52] U.S. Cl. ........................ 455/12.1; 455/430; 455/13.3
[58] Field of Search ................................ 455/12.1, 13.1, 455/13.2, 13.3, 427, 429, 430, 434, 574, 515, 567

[56] References Cited

U.S. PATENT DOCUMENTS

| | | | |
|---|---|---|---|
| 5,257,019 | 10/1993 | Schwendeman et al. | 340/825.49 |
| 5,539,921 | 7/1996 | Tayloe et al. | 455/13.3 |
| 5,596,315 | 1/1997 | Olds et al. | 340/825.03 |
| 5,790,951 | 8/1998 | Tayloe et al. | 455/427 |
| 5,930,679 | 7/1999 | Olds et al. | 455/12.1 |
| 5,974,316 | 10/1999 | Tayloe et al. | 455/429 |

*Primary Examiner*—Edward F. Urban
*Assistant Examiner*—Tilahun Gesesse
*Attorney, Agent, or Firm*—John G. Rauch; Lalita P. Williams

[57] ABSTRACT

A method for system acquisition for a subscriber unit (112) in a satellite communication system (100) maximizes life of a battery (320) of a battery-powered subscriber unit. A receiver (304) of the subscriber unit is energized only when ring bursts are expected from satellites in the system, serving to minimize consumption of battery power. During just two scans, the subscriber unit acquires enough information to enable it to identify the best beam for monitoring for a ring alert and to predict the nearby beams most likely to carry a ring alert targeted for the subscriber unit. From the received information, the subscriber unit can also perform necessary processes such as passive geolocation. The subscriber unit then enters a low-power standby mode, energizing the receiver only long enough to detect the best beam to scan for a ring alert targeted for the subscriber unit.

8 Claims, 7 Drawing Sheets

METHOD AND APPARATUS FOR SYSTEM ACQUISITION FOR A SUBSCRIBER UNIT

FIELD OF THE INVENTION

The present invention generally relates to communication devices usable with satellite communication systems. More particularly, the present invention relates to a low-power technique for monitoring an alerting channel of a satellite communication system by a satellite subscriber unit.

BACKGROUND OF THE INVENTION

Wireless communication systems generally consist of subscriber units which communicate via radio frequency (RF) communication with one or more base stations. In terrestrial cellular systems, the base stations are fixed and the subscriber units may be mobile. In some satellite communication systems, the satellites operate as base stations and are moving while the subscriber units may be fixed or mobile.

To initiate communication between the satellite communication system and the subscriber unit, the subscriber unit must acquire timing information from a satellite and synchronize its timing with satellite or system timing. To accommodate this, each satellite in the system periodically transmits bursts of a predetermined data pattern. Upon detection of a burst, the subscriber unit identifies the satellite system and synchronizes to system timing. Upon synchronization, the subscriber unit may begin communication with the system. A similar process occurs in terrestrial cellular systems.

The system acquisition process is made complicated by the nature of satellite systems. A satellite transmits a number of spot beams to the surface of the earth. Not all information, such as synchronization information or subscriber-specific alert information, is transmitted on all spot beams. Therefore, the subscriber unit must know or be able to predict which spot beams to scan to obtain synchronization information. Also, because of the substantial distance between satellites and terrestrial subscriber units, the subscriber unit must accommodate propagation delays as signals travel between satellite and subscriber unit.

Lastly, many subscriber communication devices for use with satellite communication systems, such as radiotelephones and pagers, are portable, battery powered devices. Since battery power is limited, conservation of such battery power is highly desirable. In particular, it is desirable to minimize battery power usage when the communication device is in a standby mode, acquiring and tracking system timing.

Accordingly, there is a need in the art for a method for accquiring system timing and synchronization which minimizes battery power consumption.

BRIEF DESCRIPTION OF THE DRAWINGS

The features of the present invention, which are believed to be novel, are set forth with particularity in the appended claims. The invention, together with further objects and advantages thereof may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1:
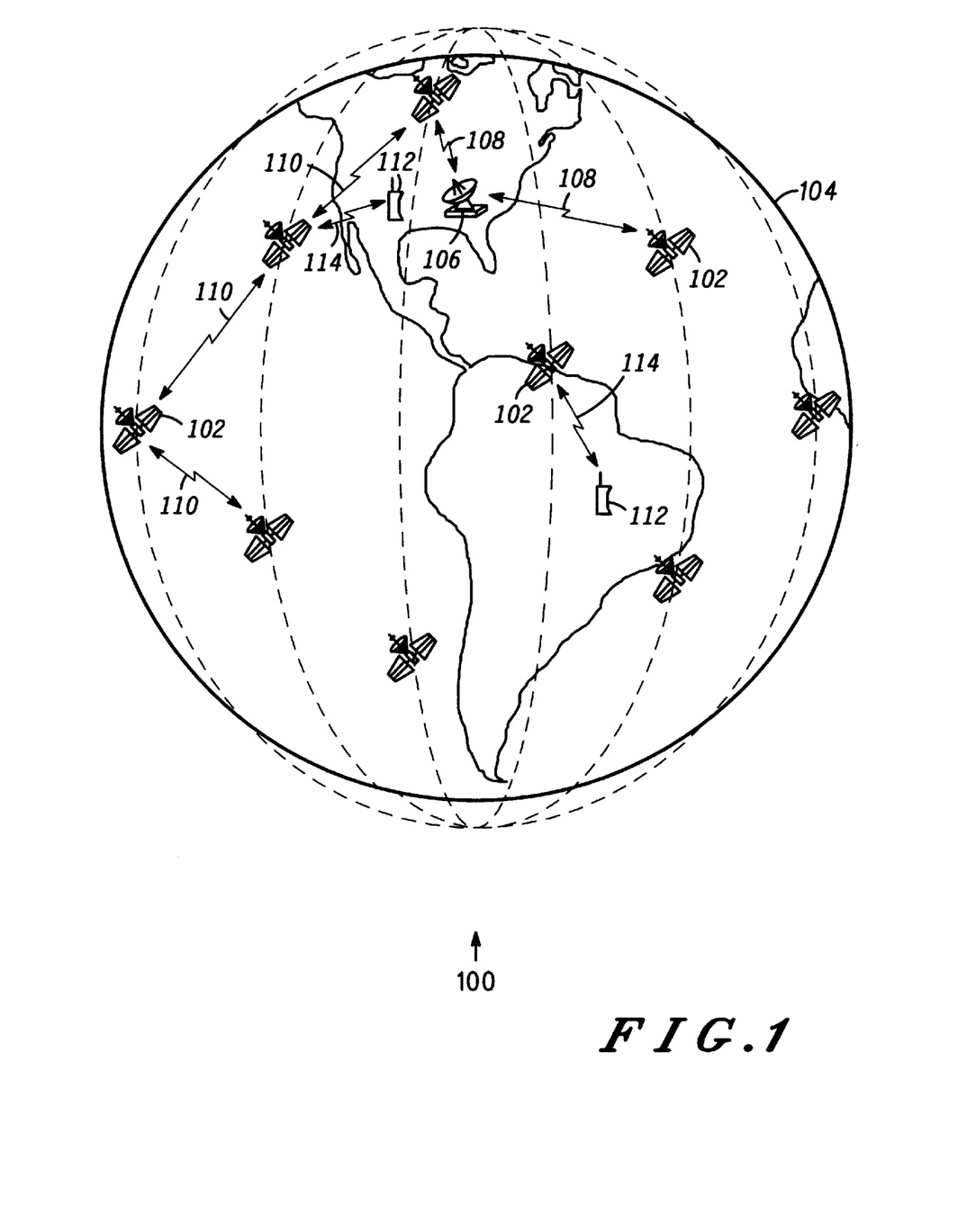
FIG. 1 is an overview diagram of a satellite communication system.

Referring now to FIG. 1, it shows an overview diagram of a satellite communications system 100. In the illustrated embodiment, several satellites (also referred to as space vehicles or SV's) 102 are placed in a relatively low polar orbit around the earth 104. The polar orbits care illustrated as dashed lines in FIG. 1. If, for example, satellites 102 are placed in orbits which are around 765 km above earth 104, then an overhead satellite 102 travels at a speed of around 25,000 km/hr with respect to a point on the surface of earth 104. This allows a satellite 102 to be within view of a point on the surface of the earth 104 for a maximum period of around nine minutes. Due to the relatively low orbits of satellites 102, line-of-sight electromagnetic transmissions from any one satellite cover a relatively small area of the earth 104 at any point in time. For example, when satellites 102 occupy orbits at around 765 km above the earth, such transmissions cover areas around 4075 km in diameter. Moreover, nothing prevents satellites 102 from incorporating directional antennas which further divide this area into smaller cells. In the illustrated embodiment, the transmission from a satellite is subdivided into forty eight spot beams or beams. As illustrated in FIG. 1, satellites 102 are preferably placed in orbits so that the entire constellation of satellites 102 provides continual coverage for the entirety of earth 104.

Satellite communication system 100 additionally includes one or more central switching offices (also referred to as "gateways") 106. Gateways 106 reside on the surface of earth 104 and are in data communication with nearby ones of satellites 102 through radio frequency (RF) communication links 108. Satellites 102 are also in data communication with one another through data communication links 110. Hence, through the constellation of satellites 102, a gateway 106 may control communications delivered to any size region of the earth 104. Gateways 106 couple to public switched telecommunication networks (not shown), through which requests for the placement of calls to subscribers of system 100 may be received. Each gateway 106 receives requests to place calls to subscribers believed to be located in a region of the earth 104 associated with that gateway 106. FIG. 1 shows only one gateway 106 for convenience. However, those ordinarily skilled in the art will appreciate that any number of gateways 106 may be employed in association with any number of regions of the earth 104. Each of such gateways 106 operates substantially as described herein.

Satellite communication system 100 also includes any number of subscriber units 112. Subscriber units 112 may be configured as radiotelephones, each including a transceiver, or as pagers, each including only a receiver, or may be included within other fixed or portable equipment. Subscriber units 112 are configured to communicate with overhead satellites 102 and to perform other functions which are discussed below. In the illustrated embodiment, at least some of the subscriber units 112 are portable and powered by a rechargeable battery. To maximize convenience to the user of the subscriber unit 112, the subscriber unit 112 minimizes battery consumption to maximize the time between battery recharges. Also to maximize user convenience, the subscriber unit is made as small and lightweight as possible.

Communications from satellites 102 are received at subscriber units 112 over communication links 114. In the illustrated embodiment of the present invention, communication links 114 utilize RF frequencies which accommodate substantially line-of-sight communication. Communication links 114 include both duplex and simplex communication links. In other words, communications travel in two directions from satellites 102 to subscriber units 112. As will be discussed in further detail below, communication links 114 are typically time division multiple access links, with frequency channels being shared among subscriber units which are assigned time slots on the channel. Communications on the communication links 114 are divided into a plurality of time slots, with each subscriber unit 112 assigned a down link time slot and an uplink time slot for communication with a satellite 102. The satellite periodically provides a synchronization burst so that the subscriber unit 112 can synchronize subscriber unit timing with satellite timing. Because of the length of the link and the variability of the length of link, there is a substantial propagation delay on the link which is widely variable as a satellite 102 moves from to horizon to apogee and back to horizon again.

Figure 2:
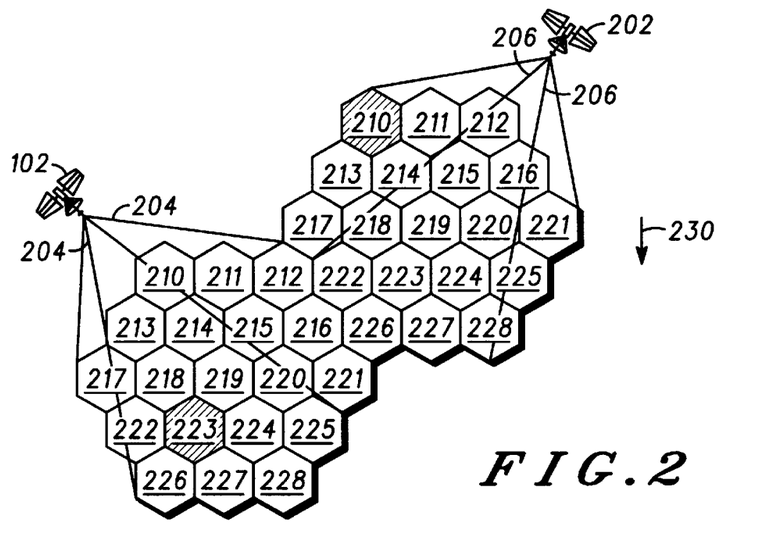
FIG. 2 is a diagram of cellular patterns formed by adjacent satellites projecting communication beams upon surface of the earth.

FIG. 2 shows a diagram of cellular patterns formed by adjacent satellites projecting communication beams upon the surface of the earth. Satellites 102 and 202 (which may be identical to satellite 102) employ frequency spectrum reuse techniques. These techniques comprise cellular partitioning of projection beamwidths. Satellites 102 and 202 generate beam set projections 204 and 206, respectively. Beam set projections 204 and 206 are bidirectional gain areas (cells) associated with antennas on satellites 102 and 202. These antennas may be individual directional antennas or a phased-array antenna capable of coherent beam projection.

Cells 210–228 may assume many shapes depending on the gain characteristics of the antennas. In FIG. 2, cells 210–228 are shown as uniform hexagons for illustrative purposes. It will be understood that the relative sizes and shapes of cells 210–228 may vary in different applications and may vary as satellite 102 and satellite 202 orbit the earth. Cells 210–228 advance in orbit direction 230 as satellites 102 and 202 orbit in direction 230.

With satellites 102 and 202 travelling at speeds of up to 25,000 km/hr with respect to the earth, cells 210–228 also travel over the earth at close to this speed. At this speed, any given point on the surface of the earth resides within a single cell for no more than around one minute.

Referring again to FIG. 1, satellites 102 communicate with subscriber units 112 over links 114 using numerous frequency channels. Thus, satellites 102 and subscriber units 112 desirably employ a frequency division multiple access (FDMA) scheme so that numerous independent communication links may be established simultaneously. The entire spectrum of these frequency channels is available within each cell.

As noted above, communication on the communication links 114 (FIG. 1) between a satellite 102 and subscriber unit include both duplex and simplex components. A traffic channel is duplex in nature, with traffic data being conveyed on both the down link (satellite to subscriber) and uplink (subscriber to satellite). A ring channel is simplex in nature, with the ring alert being conveyed on the downlink from the satellite to the subscriber with no communication in return The ring alert is conveyed or a single, predetermined frequency, always in a fixed, known part of the frame.

In one embodiment, a satellite 102 broadcasts a ring alert sequentially to each cell of cells 210–228, one cell at a time. The ring alert broadcast follows a predetermined pattern of the cells 210–228. Each cell of the 48 cells receives the ring alert during a fixed part of the frame until the alert has been broadcast to all cells. The pattern is then repeated. The period of the ring alert in any given cell is approximately 4.32 seconds. In FIG. 2, a cell 223 served by satellite 102 and a cell 210 are shaded to indicate that those cells are currently receiving the ring alert from their respective satellites. Thus, each cell is uniquely visited by the ring alert once every 48 frames. In other embodiments, the periodic basis for the ring alert visits may be changed to, for example, once every 24 frames.

Figure 3:
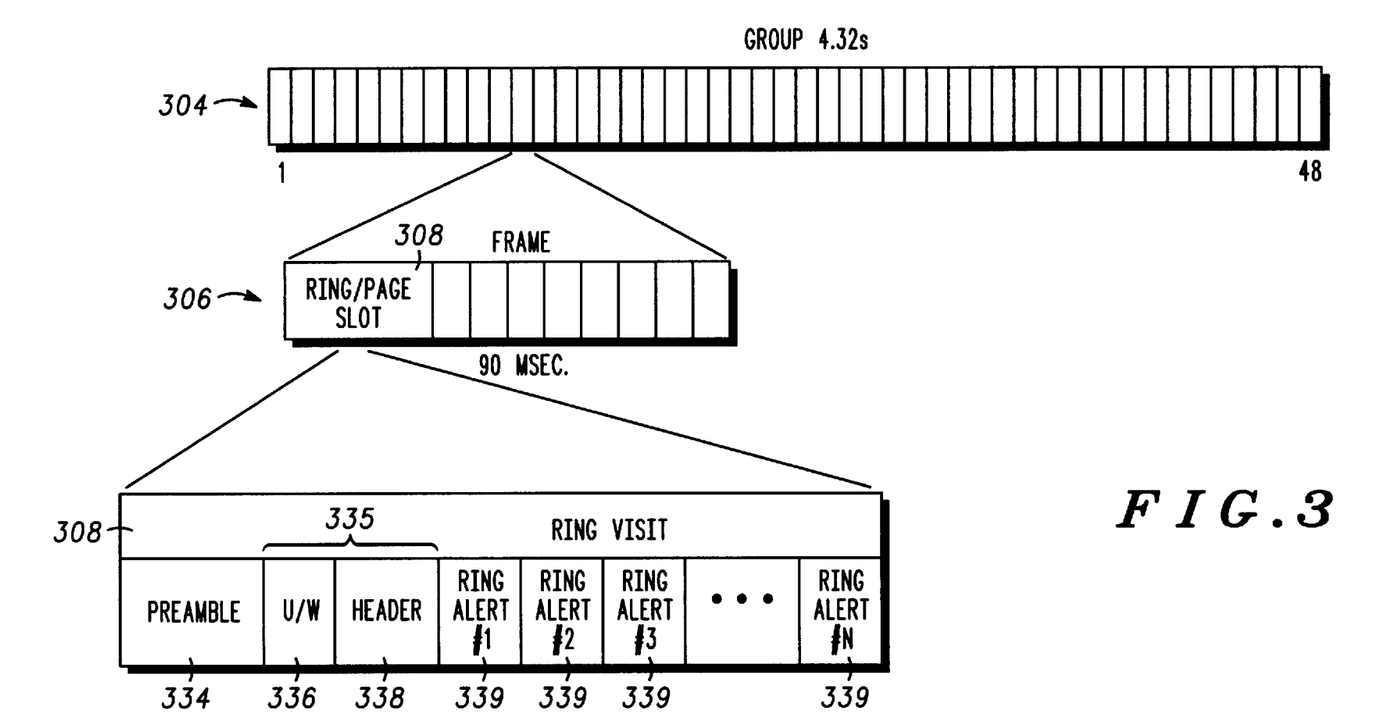
FIG. 3 is a diagram illustrating downlink timing in the satellite communication system of FIG. 1.

FIG. 3 shows a conceptual diagram of the timing hierarchy for the satellite communications system 100 of FIG. 1 The signalling channel uses a multiple-level timing hierarchy. At one level, a group 304 comprises forty-eight L-Band frames 306 of known duration, such as 90 ms. The ring visit time slot 308 occupies 20.48 ms of the 90 ms L-Band frame 406. It will be understood by one of ordinary skill that the above-described timing hierarchy is merely exemplary and that many other variations are possible, depending upon the particular system requirement.

The ring visit time slot 308 includes a preamble 334, control information 335 and ring alerts 339. The preamble 334 facilitates the acquisition of the ring alert message 308. In one embodiment, the control information 335 includes a unique word 336 and a header 338. Unique word 336 uniquely identifies a communications command between satellites and subscriber units. The header 338 includes satellite identification, antenna beam identification, satellite geographic location, beam geographic location, next ring alert interval and beam-specific broadcast channel frequency and time slot information. The ring alerts 339 indicate a request for communication with a subscriber unit located within a specific antenna beam. When a subscriber unit detects a ring alert 339 matching its own, the subscriber unit notifies the satellite of its availability to receive a call.

The satellites 102 (FIG. 1) individually transmit ring alert messages to antenna beams in sequential subscriber link frames. Since satellites 102 will only ring (send a subscriber unit identifier) a subscriber unit in a small set of antenna beams, subscriber units 112 need only monitor a ring alert channel of the set of beams within which subscriber unit 112 is located. In the illustrated embodiment, satellite 102 sends ring alerts within each of it antenna beams sequentially, rather than sending ring alerts within all beams at the same time. In this way, each antenna beam may have a unique set of ring alerts directed to specific subscriber units located within each beam.

During the ring alert time slot, the satellite transmits satellite and beam geolocation information. During each of the forty eight frames 306 of a group 304, the satellite transmits a ring burst on one beam of the forty eight beams transmitted by the satellite. The ring burst is transmitted during the ring time slot 308 and during a first 48 time slot cycle contains satellite geographic information (referred to as SV coordinates) and during a subsequent 48 time slot cycle contains beam coordinates. The beam coordinates designate the center of the beam on the earth at the time of transmission and can be used for geolocation. Thus, on each ring visit on any beam, the ring time slot 408 alternates between SV coordinate information and beam coordinate information. Such ring alert visits are separated in time by the 4.32 second duration of the group.

Figure 4:
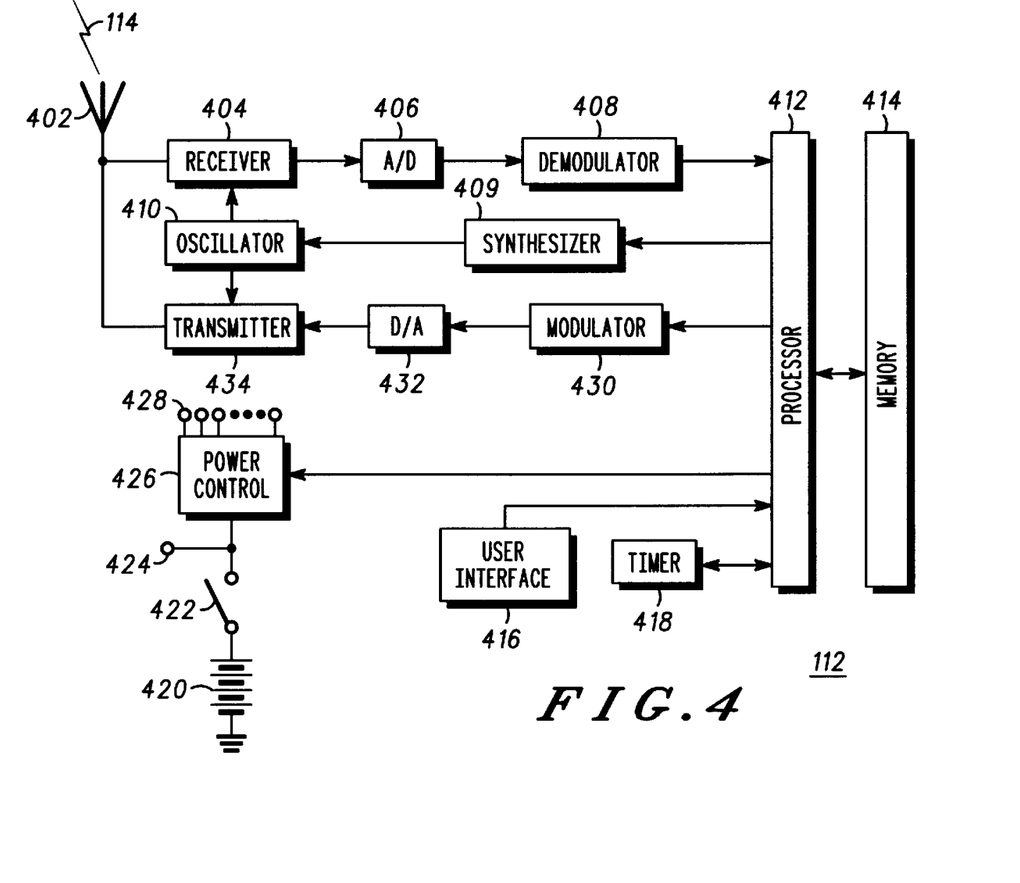
FIG. 4 is a block diagram of a radiotelephone operable in the satellite communication system of FIG. 1.

FIG. 4 shows a block diagram of a subscriber unit 112 constructed in accordance with one embodiment of the present invention. Subscriber unit 112 includes an antenna 402 through which communication link 114 is established. Antenna 402 feeds a receiver 404, which includes radio-frequency (RF) mixing, and intermediate-frequency (IF) stages (not shown) as needed to convert RF signals broadcast by satellites 102 (FIG. 1) to baseband. Receiver 404 couples to an analog-to-digital (A/D) converter 406, which digitizes the baseband signal, and A/D converter 406 couples to a digital demodulator 408 that extracts digital data from the digitized baseband signal. A synthesizer 409 receives a control signal from a processor 412 and supplies a signal to control an oscillator 410. Oscillator 410 provides an oscillation signal that receiver 404 uses in converting the RF signal to baseband.

Demodulator 408 feeds its digital data output to the processor 412. Processor 412 includes permanently stored data which does not change as a result of operating subscriber unit 112. Such permanent data includes computer programs that instruct subscriber unit 112 to perform various procedures, which are discussed below. Such permanent data also includes permanent variables which are used in the operation of subscriber unit 112, as discussed below. Memory 414 also includes temporary data, which changes as a result of operating subscriber unit 112. It is processor 412, under the control of programs stored in memory 414, that controls the operation of subscriber unit 112.

Processor 412 couples to various peripheral devices, such as a user interface 416, and a timer 418. If the subscriber unit is configured as a radiotelephone, user interface 416 typically includes a speaker, a microphone, a keypad and a display. Processor 412 controls user interface 416 to present operating information and receive command input data. Processor 412 utilizes timer 418 to synchronize its operations with system timing of the satellite communication system 100 (FIG. 1) in response to synchronization signals received from the satellite communication system 100. Those skilled in the art will appreciate that the function of timer 418 may alternatively be performed within processor 412.

Subscriber unit 112 is energized by a battery 420. Battery 420 couples through a power switch 422 to a terminal 424 and to a power control section 426. Power control section 426 switches power to terminals 428 in accordance with commands received from processor 412. Terminal 424 supplies power to at least timer 418. Terminals 428 supply power to the remaining components of subscriber unit 112, including the receiver 404. Subscriber unit 112 is de-energized when switch 422 is open, and subscriber unit 112 is fully energized and operational when switch 422 is closed and when power is routed to all of terminals 428. Subscriber unit 112 may also operate in an energized but low power Sleep Mode. Subscriber unit 112 operates in its Sleep Mode when power is not routed to one or more of terminals 428, but switch 422 is closed to route power through terminal 424 to at least timer 418.

Those ordinarily skilled in the art will appreciate that nothing prevents processor 412 from being de-energized in the Sleep Mode of operation. However, in this situation, timer 418 may advantageously control the application of power to processor 412, rather than processor 412 controlling power to itself as shown in FIG. 3. Moreover, those skilled in the art will appreciate that power may be continuously applied to at least a portion of memory 320 during the Sleep Mode to prevent the destruction of temporary data.

For communication from the subscriber unit 112 to a remote satellite, the subscriber unit 112 includes a modulator 430, a digital to analog converter (DAC) 432 and a transmitter 434. The modulator 430 receives user data from the processor 412. The modulated user data is converted from digital form to analog form in the DAC 432 and provided to the transmitter 434. The transmitter, in response to the analog signal and an oscillator signal from the oscillator 410, feeds the antenna 402 to transmit user information to the satellite.

The satellite communication system 100 of FIG. 1 is capable of initiating communication with subscriber units anywhere in the world. To begin communication with the satellite communication system, a subscriber must synchronize its timing with system timing. Thereafter, to detect incoming calls, the subscriber unit must search for a call initiation signal at the proper time defined by the system.

The L-Band is the portion of the radio frequency spectrum which is used for the satellite link 114 with the subscriber unit. The L-Band subsystem provides subscriber channels including duplex channels which support two-way communications services, and simplex channels which support one-way messaging services. In addition to the bearer service channels, the L-Band subsystem provides channels that support system overhead functions. These functions include acquisition and access control, subscriber ring alert, subscriber geolocation, and subscriber handoff between antenna spot beams and satellites.

Figure 5:
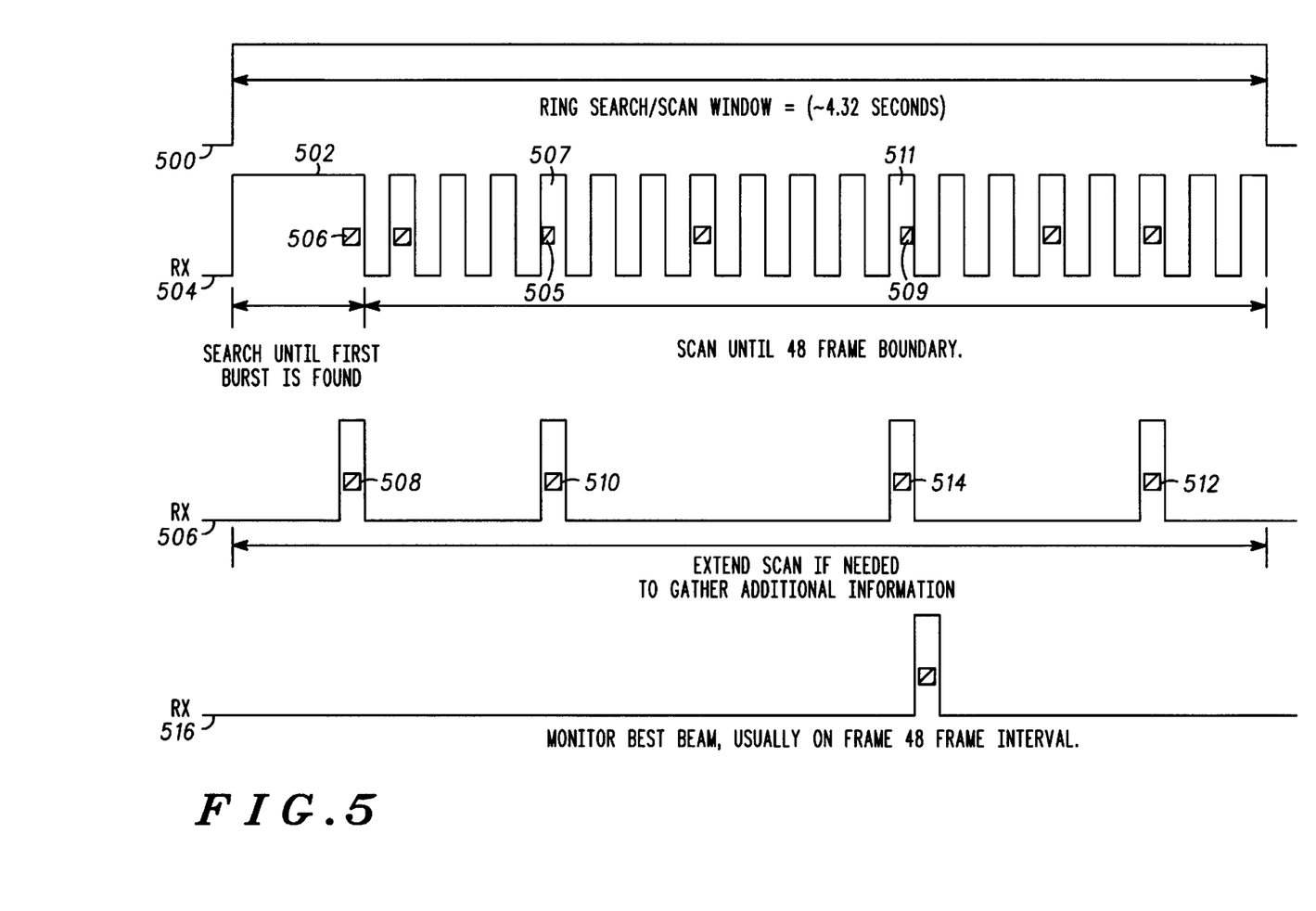
FIG. 5 shows timing diagrams for receiver operation in accordance with the present invention.

FIG. 5 shows timing diagrams for operation of a subscriber unit receiver in accordance with the present invention. FIG. 5 will be described in conjunction with FIG. 6, FIG. 7 and FIG. 8 which together illustrate a method of operating the subscriber unit 112 (FIG. 3) in accordance with the present invention.

In FIG. 5, window 500 defines the time window during which the ring burst may be transmitted on an unknown beam by an unknown satellite. At the beginning of the method, the subscriber unit has not acquired system timing from the satellite communication system and is not synchronized to system timing. This situation corresponds to, for example, first turning on the subscriber unit in preparation for making or receiving a call. The subscriber unit must locate the ring alert in the window 500 and use the information contained on the ring burst to acquire the system and get synchronized. A brute-force method would have the subscriber unit turn on its receiver during the entire 4.32 second duration of the window 500. However, such a technique is wasteful of battery power because the ring alert information is transmitted only during a small portion of the 90 ms frame 308 (FIG. 3). Also, a subscriber unit may be positioned to receive a few beams from a few different satellites. Thus, there is usable system identification and synchronization information available only during short, discontinuous portions of the window 500.

The method according to the present invention maximizes battery life by minimizing the time during the window 500 during which the receiver and other necessary systems of the subscriber unit are energized. The remaining timing diagrams of FIG. 5 illustrate energizing or deenergizing of the receiver of the subscriber unit. When the signal labelled RX has its logic 1 value, the receiver is energized or activated. When RX has its logic 0 value, the receiver is deenergized or deactivated. The method will now be described with reference to FIGS. 6–8.

Figure 6:
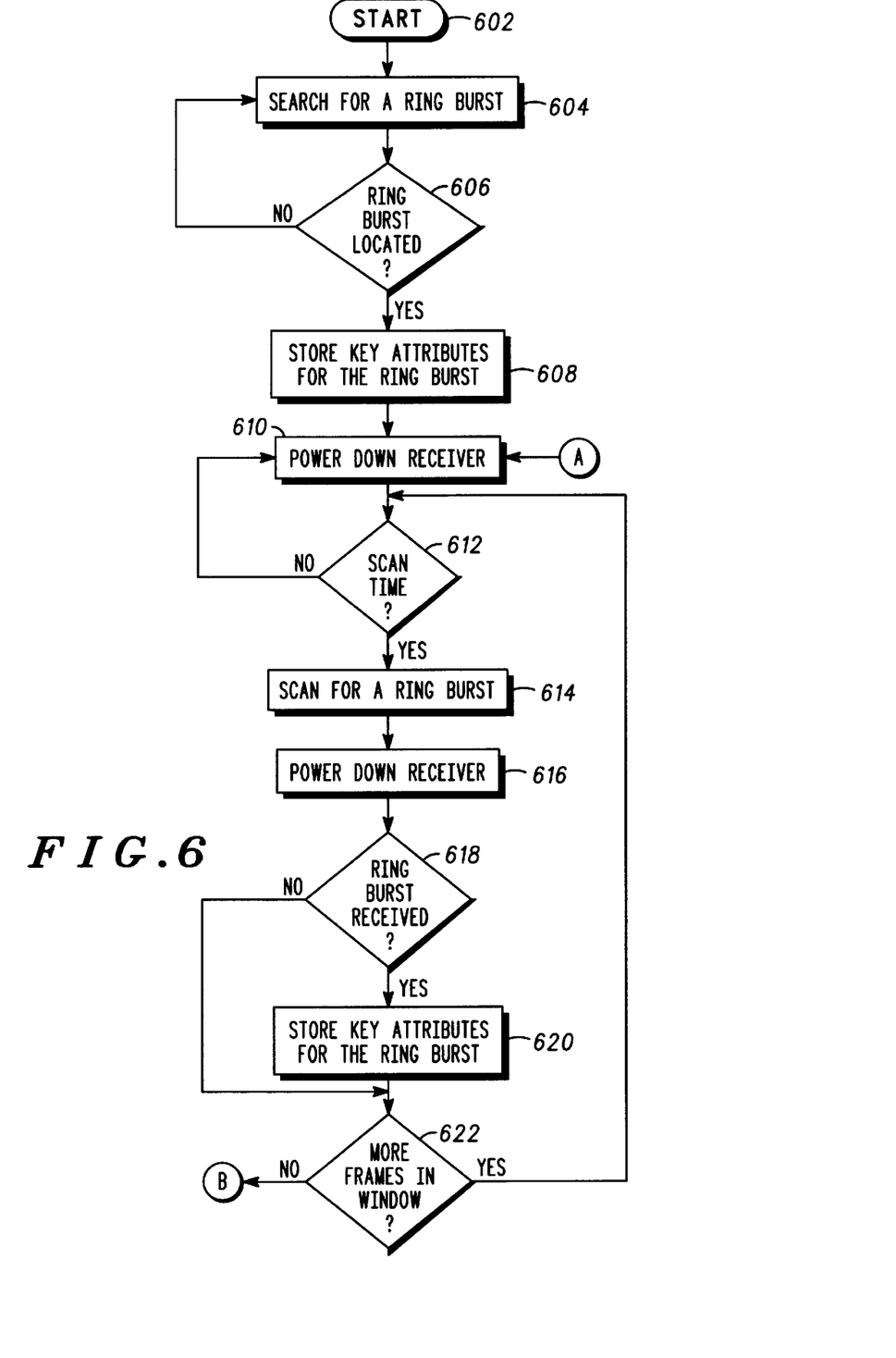
FIG. 6 is a flow diagram illustrating a method according to the present invention.

The method begins at step 602, labelled START in FIG. 6. At step 604, the receiver is energized to begin searching for a ring burst. With reference to FIG. 4, the receiver 404 is energized to receive system signals from one or more satellites. The signals are converted to digital form in the ADC 406, demodulated in the demodulator 408 and analyzed in the processor 412. The processor 412 compares the received signals to a known pattern for the ring burst. If the received signals correspond to a ring burst, then the received signals are considered to be a ring burst. Referring again to FIG. 6, at step 606 the subscriber unit determines if it has received a ring burst. If it has, control proceeds to step 608. If not, the loop including steps 604 and 606 is repeated until a ring burst is found. In FIG. 5, this corresponds to search window 502 of receiver signal 504.

When a ring burst 506 is detected, the key attributes for the ring burst are stored, step 608, and the receiver is deenergized, as indicated by the low level on the signal RX, step 610. The key attributes include satellite coordinates, the beam coordinates transmitted on the ring burst and beam power as determined by the subscriber unit's receiver. As noted above, the satellite coordinates and the beam coordinates are transmitted alternately, so on the first ring visit, only one of the satellite coordinates and the beam coordinates are received and stored. In place of beam power, some other indicator of signal quality could be used as a key attribute of the beam.

The receiver remains deenergized, step 610, until it is again time to scan for another beam. The next scan time is determined in response to the timing of the first ring burst 506. Subsequent ring bursts can only occur within a predetermined window of time following the ring burst 506, accounting for propagation delay, timing variations and other factors. As is indicated in FIG. 5, signal RX, the scan window during this first scan is intentionally set wider than the predetermined ring burst duration of the ring burst. This is because the time of reception of the ring burst will vary due to propagation delay from the satellite which transmitted the burst. There is a known range of propagation delays, from a minimum delay perhaps for a satellite directly overhead to a maximum delay for a satellite low on the horizon. This is indicated in FIG. 5 by the ring bursts occurring partially before (burst 505) and partially after (burst 509) the scan windows (window 507 and window 511, respectively). In one embodiment, the scan window for each beam is set to a duration at least equal to twice the maximum propagation delay plus the duration of the ring burst. Thus, at step 612, when the subscriber unit determines that it is time to begin a scan for a ring burst, the receiver is powered up and the subscriber unit scans for a ring burst for a predetermined duration.

At step 616, the receiver is again powered down or deenergized. At step 618, the subscriber unit determines if it received a ring burst from a beam of a satellite. If not, control returns to step 612 to await the next scan time. If a ring burst was received, at step 620, key attributes for the ring burst are stored. As noted above, in one embodiment, these attributes include satellite coordinates and beam coordinates. Other information may be stored as well. The key attributes may be stored as a table, for example in memory 414 (FIG. 4).

At step 622, the subscriber unit determines if there are more frames to scan. For example, in the illustrated embodiment of FIG. 5, the window 500 includes forty eight frames, each frame corresponding to a beam transmitted by a satellite. The forty eight frames form forty eight possible ring visits, where the satellite communication system can transmit a ring alert on a beam to a subscriber unit. To capture as much information as possible about the presence of satellites and the relative strength of their respective signals, the subscriber unit receives ring bursts during each possible frame. Thus, the subscriber unit tracks the frames or bursts it has scanned, for example by keeping a count or by tracking the time position of the scanned bursts. If all ring bursts have not been scanned, control returns to step 612 to await the next scan time. If all busts have been scanned, control proceeds to step 702 of FIG. 7.

Figure 7:
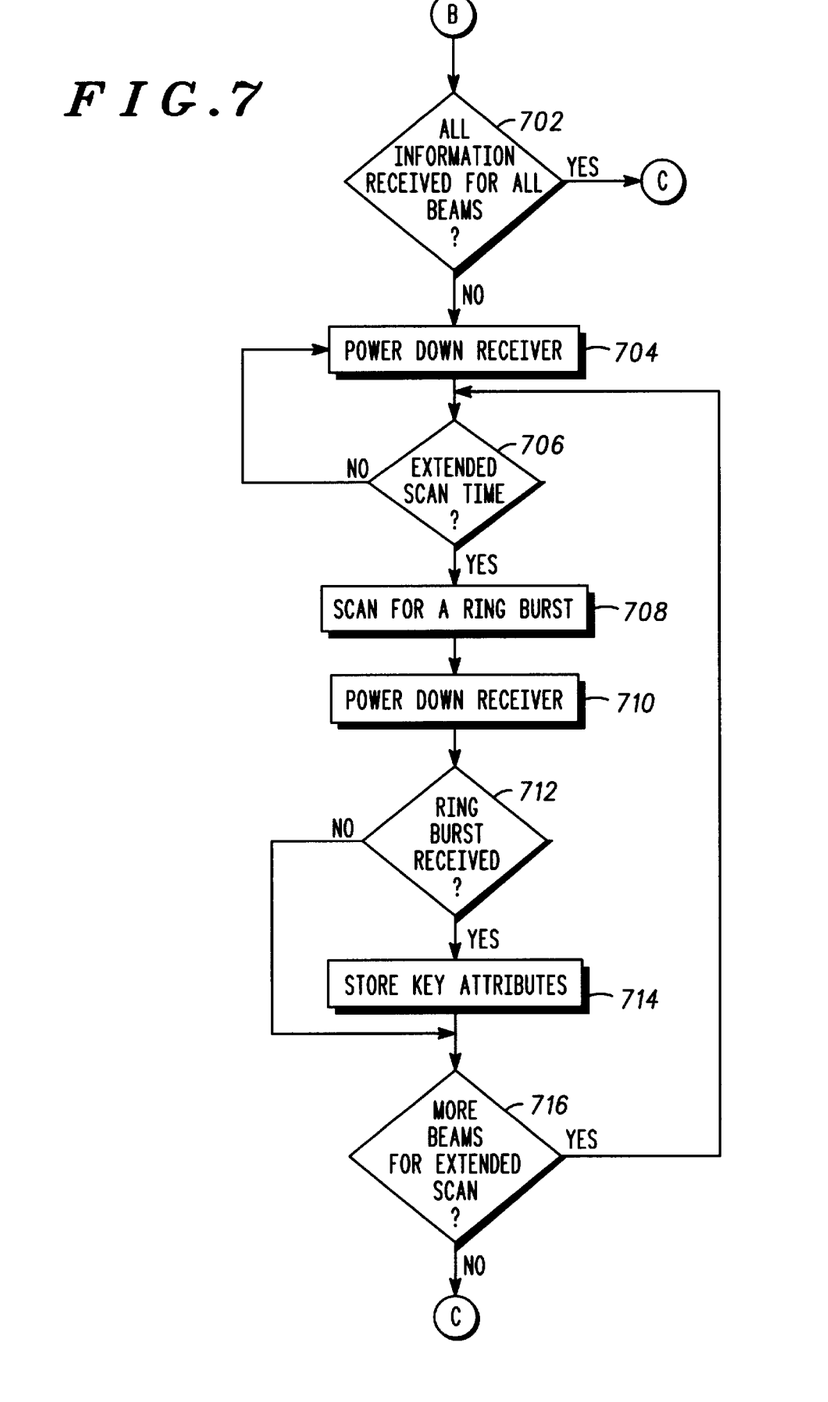
FIG. 7 is a flow diagram further illustrating the method of FIG. 6.

In the method steps illustrated in FIG. 7, the subscriber unit receives additional information, if needed, during an extended scan time. As noted above, satellite coordinate and beam coordinate information are transmitted alternately, so on the first ring visit, only one of the satellite coordinates and the beam coordinates are received and stored. During the initial scan time illustrated in FIG. 6, the subscriber unit received one of the satellite coordinates and the beam coordinates. During the extended scan time, the subscriber unit receives the other of the satellite coordinates and the beam coordinates, if needed.

This is illustrated in FIG. 5 by receiver signal 506. Beam 508, beam 510 and beam 512 are scanned, along with beam 514 which has been identified as the best beam. Comparing receiver signal 506 with receiver signal 504 from the initial scan, it is clear that the receiver is not energized during this scan for all beams detected during the first scan. Beams transmitted by the same satellite are not scanned unless beam coordinates are needed. Moreover, because the subscriber unit now has propagation delay information for each satellite based on the previous scan, the time window during which the receiver is energized is reduced in duration, further reducing battery drain. The window may be reduced to the duration of the ring burst plus a small guard time. Thus, the duration when the receiver must be energized has been substantially reduced during the second scan. After this second scan, the subscriber unit has the satellite and beam coordinates it needs to perform other processes, such as passive geolocation. FIG. 7 illustrates the extended scan operation.

At step 702, the method determines if the subscriber unit has received all the key attributes for all beams. If so, control proceeds to step 802, FIG. 8. If not, the subscriber unit needs to get the other attributes for any remaining beams. At step 704, the subscriber unit powers down its receiver and any other unnecessary circuitry in order to conserve battery power.

At step 706, the subscriber unit determines if the extended scan time has arrived. This is the time when the subscriber unit expects to receive additional information for a beam. The time is tracked by maintaining a time base at the subscriber unit which is synchronized with the satellite system. If the time to perform the extended scan has not arrived, the subscriber unit remains in a loop including step 704 and step 706.

If the extended scan time has arrived, at step 708 the subscriber unit scans for a ring burst as illustrated by of receiver signal 504 in FIG. 5. After scanning for the ring burst, the receiver is powered down, step 710, and the subscriber unit determines if it received a valid ring burst. If not, control proceeds to step 716. If a valid ring burst was received, the key attributes are stored, step 714.

At step 716, the subscriber unit determines if there are more beams for the extended scan. If the subscriber unit has received and stored the attributes for all ring bursts including beam coordinates for all visible beams, the control proceeds to step 802, FIG. 8. If not, control returns to step 706 to await the next extended scan time.

Figure 8:
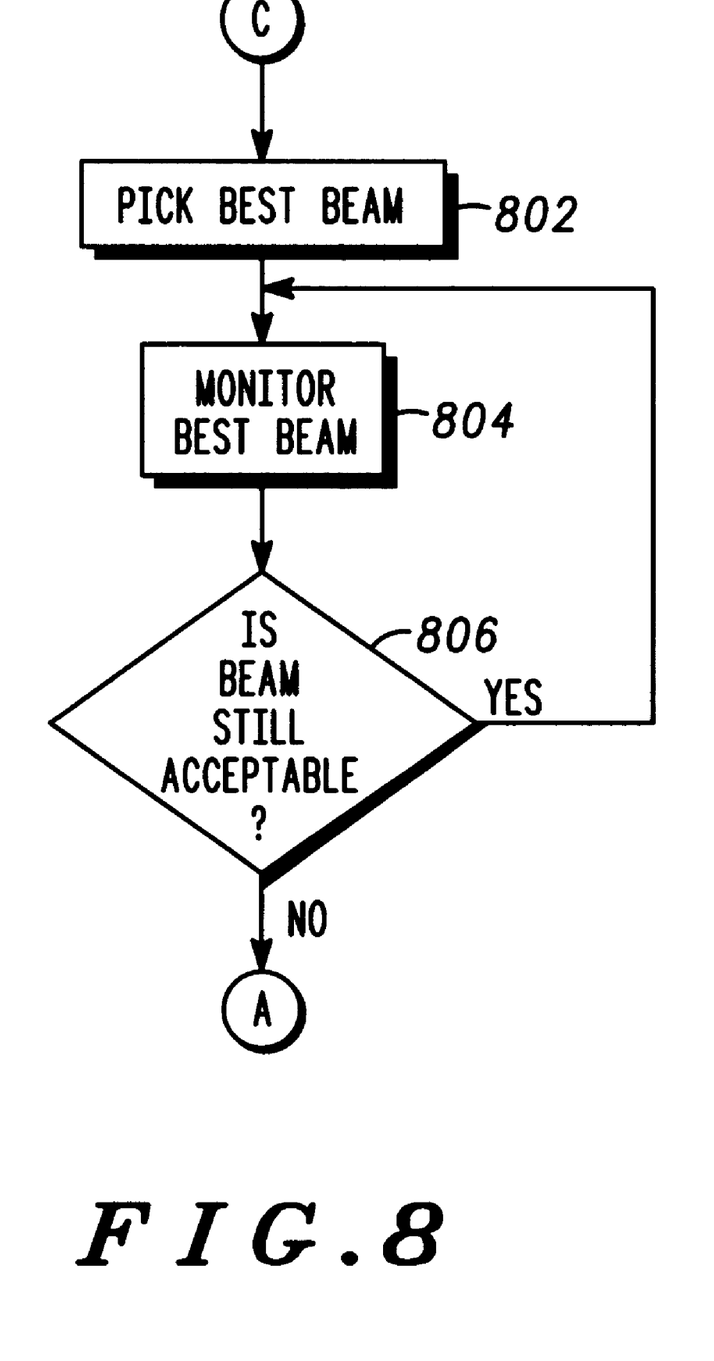
FIG. 8 is a flow diagram further illustrating the method of FIG. 6.

In the method steps illustrated in FIG. 8, the subscriber unit attempts to find the best beam currently received by the subscriber unit. The best beam may be identified using any suitable quality criteria. The best beam is then monitored until it no longer meets these quality criteria. At that time, a re-scan is done to find the new best beam. At step 804, the beam identified as the best beam is selected and monitored. As noted above, any suitable criterion may be used for deciding which beam is the best beam.

At this point, after a single scan of the 4.32 second window 500 and possible additional time, as needed, to complete the extended scan, the subscriber unit has selected the best beam which it will monitor for incoming ring alerts as it waits in standby mode for an incoming call. If all satellites with different SV ID's have been identified, during a second scan the beams from these different satellites are monitored, along with the best beam.

Referring again to FIG. 8, the subscriber unit now enters a low-power standby mode wherein it only scans the best beam ring burst. This is illustrated by receiver signal 516 in FIG. 5. To initiate a call to the subscriber unit, the satellite communication system sends a ring alert which uniquely identifies the particular subscriber unit and causes the subscriber unit to respond by completing the call after receiving the ring burst. From these received ring bursts, the subscriber unit updates its local timing to maintain synchronization with the timing of the satellite communication system. The scan window is maintained as narrow as possible to minimize the duration when the receiver is energized while still ensuring that the entire ring burst is accurately received.

The subscriber unit remains in this standby mode until a call is received or a call is initiated or until it is time to re-register with the system. In FIG. 8, at step 806, the subscriber unit determines if the best beam, as transmitted by the satellite on the ring burst, no longer meets the quality criteria. These criteria may be different from the criteria used to select the best beam. If the quality criteria are satisfied, the subscriber unit remains in a loop including step 814 and step 816. Otherwise, control returns to step 610 (FIG. 6) to again scan for available beams and locate the best beam for re-registration.

As can be seen from the foregoing, the present invention provides a method for system acquisition for a subscriber unit in a satellite communication system. A receiver of the subscriber unit is energized only when ring bursts are expected from satellites in the system, serving to minimize consumption of battery power. During just two scans, the subscriber unit acquires enough information to enable it to identify the best beam for monitoring for a ring alert and to predict the nearby beams most likely to carry a ring alert targeted for the subscriber unit. From the received information, the subscriber unit can also perform necessary processes such as passive geolocation.

While a particular embodiment of the present invention has been shown and described, modifications may be made. It is therefore intended in the appended claims to cover all such changes and modifications which fall within the true spirit and scope of the invention.

What is claimed is:

1. A method for system acquisition for a subscriber unit in a satellite communication system, the method comprising the steps of:

(a) in a first scan window, activating a receiver of the subscriber unit long enough to detect a ring burst transmitted on a beam from a satellite, the beam comprising and indicator of beam quality and one of either beam coordinates or satellite coordinates;

(b) storing the indicator of beam quality and one of either beam coordinates or satellite coordinates;

(c) deactivating the receiver until a predetermined scan time;

(d) repeating steps (a) through (c) until all possible beams in the first scan window have been scanned;

(e) in a second scan window, activating the receiver to detect a ring burst transmitted on a beam from a satellite, the beam comprising an indicator of beam quality and an opposite of the one of either beam coordinates or satellite coordinates detected in step (a);

(f) storing the indicator of beam quality and the opposite of the one of either beam coordinates or satellite coordinates;

(g) deactivating the receiver until a predetermined scan time;

(h) for each ring burst detected during the first window scan that was transmitted from a different satellite, repeating steps (e) through (f);

(i) identifying a best beam; and (j) thereafter, intermittently activating the receiver to monitor only the best beam for a ring alert targeted for the subscriber unit.

2. The method of claim 1 wherein activating the receiver in the first scan window comprises the steps of initially activating the receiver for a duration sufficient to accommodate the ring burst and a propagation delay and activating the receiver in the second scan window comprises the step of activating the receiver only long enough to accommodate the ring burst while delaying activation of the receiver to accommodate the propagation delay.

3. The method of claim 1 wherein the indicator of beam quality is beam power.

4. A system acquisition method for a subscriber unit in a satellite communications system, the method comprising the steps of:

(a) at the subscriber unit, performing a first scan operation by detecting a data burst transmitted on a beam of a satellite of the satellite communication system, the beam, comprising an indicator of beam quality and one of either beam coordinates or satellite coordinates;

(b) at a subsequent time determined in response to timing of the data burst, detecting another data burst transmitted on another beam;

(c) repeating steps (a) through (b), storing the indicator of beam quality and one of either beam coordinates or satellite coordinates until all possible beams have been scanned;

(d) performing an extended scan operation by detecting a data burst transmitted on a beam of a satellite of the satellite communication system, the beam comprising an indicator of beam quality and an opposite of the one of either beam coordinates or satellite coordinates detected in steps (a) and (b);

(e) storing the indicator of beam quality and the opposite of the one of either beam coordinates or satellite coordinates;

(f) for each data burst detected during the first scan operation that was transmitted from a different satellite, repeating steps (d) through (e);

(g) identifying a best beam; and (h) thereafter, intermittently monitoring only the best beam for a ring alert targeted for the subscriber unit.

5. The system acquisition method of claim 4 wherein step (a) comprises initially activating a receiver of the subscriber unit until the data burst is detected and then deactivating the receiver, and step (b) comprises activating the receiver only during a time window when the another data burst is expected plus an additional time to ensure accurate and complete reception of the another data burst.

6. The system acquisition method of claim 5 wherein step (b) further comprises the step of determining the subsequent time to accommodate propagation delay of the another data burst.

7. The method of claim 4 wherein the indicator of beam quality is beam power.

8. A subscriber unit for a satellite communication system, the subscriber unit comprising:

a battery for providing operating power to the subscriber unit;

a receiver for receiving transmissions on beams from one or more satellites;

a power control section for selectively decoupling the receiver from the battery;

a processor coupled to the receiver and the power control section for in a first scan, activating the receiver only long enough to detect an initial synchronization signal from a satellite, the processor activating the receiver and the power control section subsequently only long enough to detect all possible transmitted synchronization signals of a communication frame, the processor storing in a memory an indicator of beam quality and one of either beam coordinates or satellite coordinates conveyed on the signals, the processor performing an extended scan to receive and store an indicator of beam quality and an opposite of one of either beam coordinates or satellite coordinates received during the first scan and conveyed on synchronization signals from a different satellite, the processor identifying a best beam and subsequently controlling the power control section to energize the receiver only long enough to detect subsequent transmissions of the best beam.

* * * * *